United States Patent [19]

Leversee

[11] Patent Number: 4,638,567
[45] Date of Patent: Jan. 27, 1987

[54] KEY DECODING DEVICE FOR AUTOMOBILES

[76] Inventor: Garrett J. Leversee, 5669 W. 78th St., Los Angeles, Calif. 90045

[21] Appl. No.: 816,363

[22] Filed: Jan. 6, 1986

[51] Int. Cl.⁴ ............................................. G01B 5/20
[52] U.S. Cl. ...................... 33/540; 409/82; 33/172 R
[58] Field of Search ............... 33/539, 540, 172 R, 33/549, 553, 554; 409/81, 82; 70/460; 269/61, 63, 64, 67, 68, 74, 81; 83/413, 414, 238, 239

[56] References Cited

U.S. PATENT DOCUMENTS

| | | | |
|---|---|---|---|
| 1,995,798 | 3/1935 | Curtis | 409/81 |
| 2,021,201 | 11/1935 | Roos | 33/539 |
| 2,707,335 | 5/1955 | Falk | 33/174 F |
| 2,717,452 | 9/1955 | Richardson et al. | 33/552 |
| 3,113,386 | 12/1963 | Bolfar | 33/539 |
| 3,719,115 | 3/1973 | Muri | 83/414 |
| 3,775,855 | 12/1973 | Marmel | 33/174 F |
| 4,062,261 | 12/1977 | Stahl | 409/81 |
| 4,090,303 | 5/1978 | Uyeda | 33/174 F |
| 4,271,597 | 6/1981 | Fortunato | 33/174 F |
| 4,283,859 | 8/1981 | Roland | 33/174 F |

Primary Examiner—Charles Frankfort
Assistant Examiner—Patrick R. Scanlon
Attorney, Agent, or Firm—Milton Gerstein

[57] ABSTRACT

A device for precisely measuring the depths of cuts of a Mercedes Benz key at the critical depth locations which determine the unique characteristics of each such key. In a first embodiment for measuring a single shelf key, the key is measured by a projecting probe of a circular gauge, by moving the key via a slide plate. The slide plate is incremented by a rack-and-pinion arrangement, the rack forming part of one side edge surface of the slide plate. A stop member cooperates with cut-outs formed in the other side edge surface of the slide plate for holding the slide plate, and therefore the key, at each of the critical locations where depth of cut is to be measured. In the second embodiment, a double shelf key may be measured by the use of a pair of oppositely disposed and aligned probe tips of a pair of circular measuring gauges.

6 Claims, 14 Drawing Figures

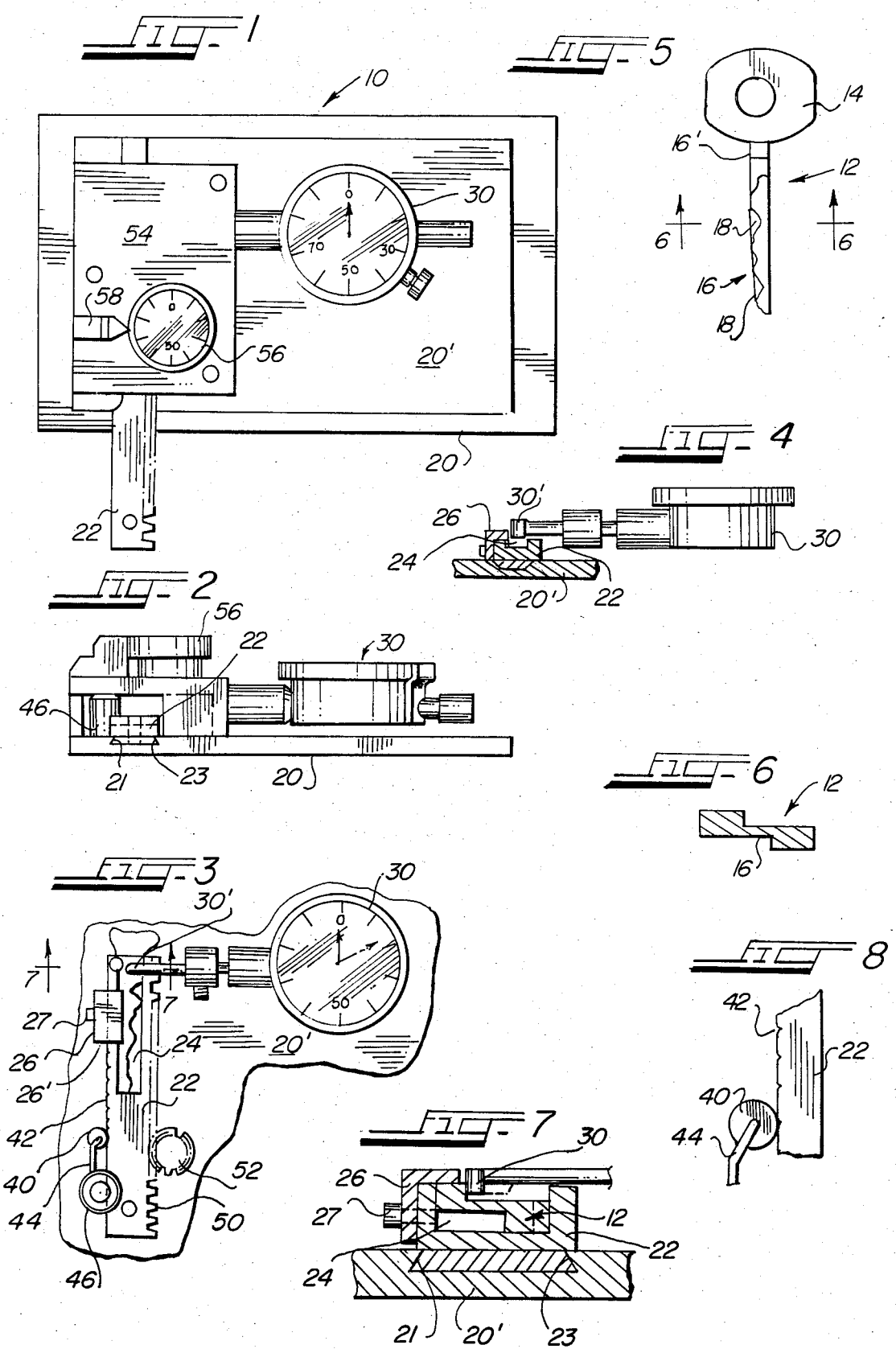

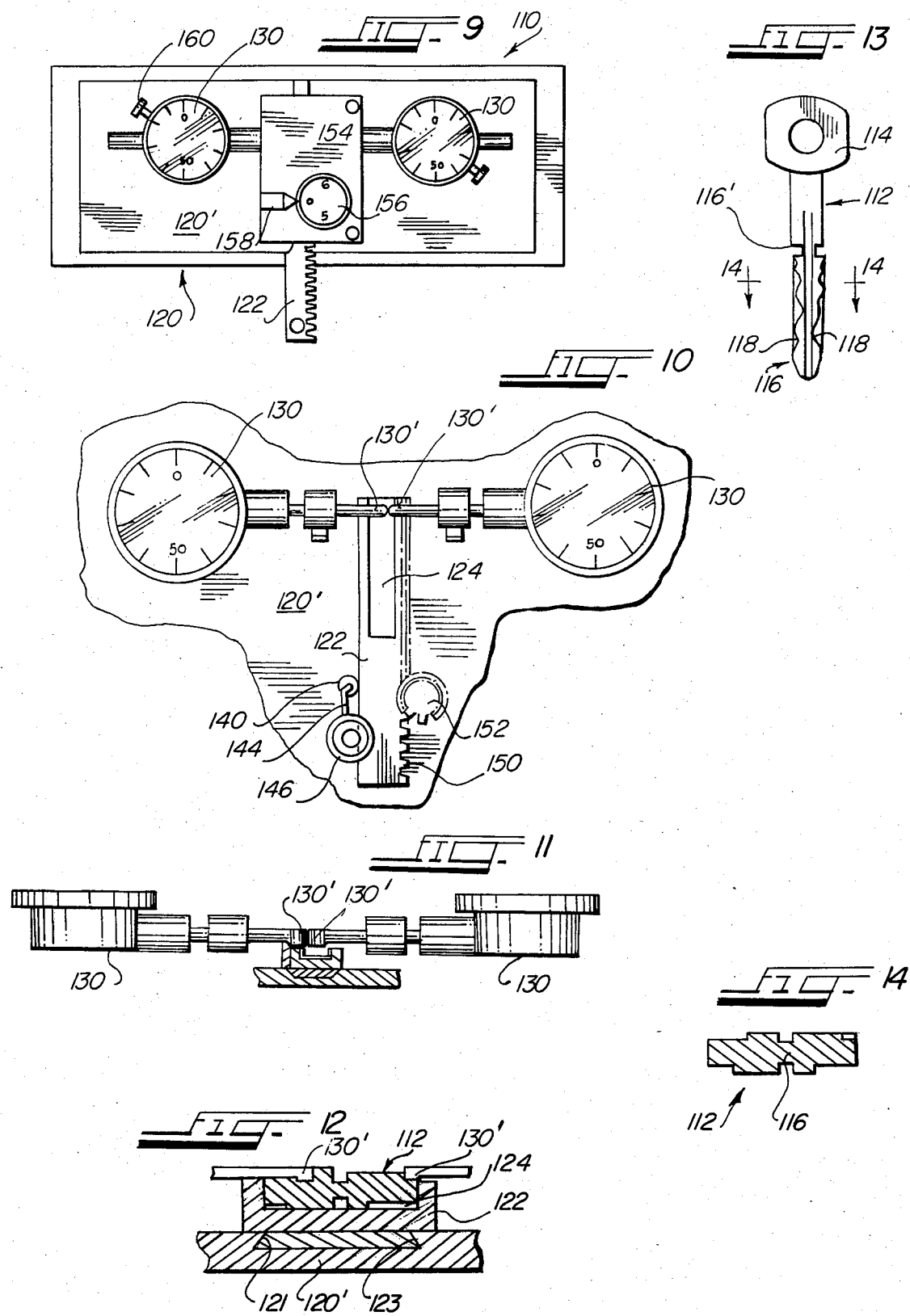

KEY DECODING DEVICE FOR AUTOMOBILES

The present invention is directed to a decoder apparatus for automobile keys, and especially for Merecedes Benz automobile keys. Hitherto, when a key has been lost, misplaced, or not at-hand, in order to either gain entry to the locked vehicle, a locksmith must be called to the site of the automobile, or the owner must seek a replacement key from the manufacturer itself. In the case of Mercedes Benz, the owner must write or cable the company in Germany in order for the company to replace the lost or stolen key, which is achieved by keeping a record of each key that has been assigned to each automobile. In the case of an automobile dealership, when it is common for the dealership to lose or misplace keys, replacement keys are again only obtained by contacting the compnay in Germany, furnishing them with the proper information regarding the vehicle in question. The dealership holds a list of all of the keys and their depths of cuts for each vehicle that was sold or is to be sold by that dealership. However, the requirement for lost or stolen keys, without duplicates available from which another duplicate may be made, has proven to be quite troublesome to both dealers and owners alike. It would, therefore, be very advantageous to allow for a reproduction of a key without the need of seeking such reproductuion in a foreign country, which is time-consuming, somewhat costly, and very inconvenient.

The present invention is, therefore, directed to an apparatus for precisely measuring the depths of cuts of the key, so that these depths of cuts may be stored away in encoded form for later reproduction of the very key if the need arise. There are known decoding apparatuses. One such decoding apparatus is shown in U.S. Pat. No. 4,090,303—Uyeda, which measures the depths of the key cuts in an approximate manner so that an index card may be used to indicate the depth of the cuts of the key. However, this prior art device cannot be used for exact and precise measurements, but is only used to give a reading for the cuts that will match a pre-selected template card for indicating the approximate depths of cuts of the key. Such an apparatus will not work for automobile keys, and especially Mercedes Benz keys.

SUMMARY OF THE INVENTION

It is, therefore, the primary objective of the present invention to provide a decoding apparatus for automobile keys, and especially Merecedes Benz keys.

It is also an objective of the present invention to provide a decoding apparatus for Mercedes Benz keys that will precisely and accurately measure the depth of each cut of the key, and encode it, for subsequent keeping in the case of reproduction requirements therefor, in the case of loss.

It is still another objective of the present invention to provide a decoding apparatus for Mercedes Benz keys which will measure the depth of cut for each of the ten cuts of the key, in the case of a single shelf Mercedes Benz Key, while in a second embodiment will measure the depth of cut of each of the seven cuts of a double shelf key, on both sides thereof simultaneously.

Toward these and other ends, the decoding device for Mercedes Benz keys of the present invention is provided with a slide for holding the Mercedes Benz key, which slide is incrementable to position in a precise manner each of the cuts of the key adjacent to and in operative alignment with a depth reading gauge, of the circular type. Fine-adjusting means are provided for advancing the slide carrier to position each cut at the gauge. The slide carrier is associated with indexing means that increment the slide carrier by one cut at a time, for the measurement thereof. In the preferred form of the invention, the slide carrier is incremented by a rack-and-pinion type gearing arrangement, with the edge surface of the slide carrier serving as the rack thereof. The opposite edge of the slide carrier is provided with a plurality of recesses for receiving therein the indexing means, so that the slide carrier may be incremented cut-by-cut for the depth measurement of each cut in a precise manner.

BRIEF DESCRIPTION OF THE DRAWING

The invention will be more readily understood with reference to the accompanying drawing, wherein FIG. 1 is a top plan view of the key decoding device for Merecedes Benz autombile keys according to the first embodiment of the invention for measuring single-shelf keys;

FIG. 2 is a side elevational view of the key decoding device of FIG. 1;

FIG. 3 is a broken away, top view of the key decoding device of FIG. 1, showing the inner structure thereof;

FIG. 4 is a side elevational view in partial cross-section showing the depth measuring gauge in relationship to the slide carrier of the present invention;

FIG. 5 is a plan view showing a single shelf, Mercedes Benz key which is measured by the device of FIG. 1;

FIG. 6 is a cross-sectional view taken along line 6—6 of FIG. 5;

FIG. 7 is a cross-sectional view taken along line 7—7 of FIG. 3;

FIG. 8 is a plan view showing the portion of the indexing means of the present invention for ensuring that the key slide carrier is incremented at one cut at a time;

FIG. 9 is a top plan view similar to FIG. 1 and showing the second embodiment of the present invention for measuring precisely the depths of cuts of a double shelf Merecedes Benz key;

FIG. 10 is a broken-away, top view showing the key slide carrier and indexing mechanism of FIG. 9;

FIG. 11 is a side elevational view of the embodiment shown in FIG. 10;

FIG. 12 is a cross-sectional view showing the measuring of a double-shelf key by the embodiment of FIG. 9;

FIG. 13 is a plan view showing a Mercedes Benz double shelf key the depths of cuts of which are measured by the embodiment of FIG. 9; and FIG. 14 is a cross-sectional view taken along line 14—14 of FIG. 13.

DETAILED DESCRIPTION OF THE INVENTION

Referring now to the drawing in greater detail, the decoding device for Mercedes Benz keys, and the like, is shown in FIG. 1 by reference numeral 10. The device of FIG. 1 is for a single shelf key, a typical such key being shown in FIGS. 5 and 6 and indicated by reference numeral 12. The key 12 includes a head portion 14 and shaft portion 16, which shaft portion 16 includes a number of cut-outs 18, the depth along which is to be measured by the device 10. The cut-outs 18 shown in FIG. 5 are included on both sides of the shaft 16, such that the cut-outs 18 of one side face in the opposite direction as those of the other side. In the Mercedes Benz key 12, there are ten critical depth measurements along the shaft 16 starting at the shoulder 16' and extending away from the shoulder toward the tip of shaft, to thereby include all of the cut-outs 18. These depth measurements are spaced therealong such that the first depth measurement is spaced from the shoulder 16' by 0.100 inches, with the second depth measurement being at the distance of 0.190 inches from the shoulder. The other eight depth measurements are taken at: 0.280 inches, 0.370 inches, 0.460 inches, 0.550 inches, 0.640 inches, 0.730 inches, 0.820 inches, 0.910 inches, and the last depth measurement, called the tip measurement, from between 1.030 and 1.120 inches. Thus, each key is distinctively determined by the depth measurements at these ten relative locations along the shaft 16, as compared to the shoulder 16', in the case of the single shelf key of Mercedes Benz.

The decoding device 10 is expressly made for determining the precise and exact depth measurements of such a single shelf key 12 at each of the ten critical and determinative locations above-enumerated. To accomplish this, the device 10 includes a main housing 20 which slidingly mounts a key-holding slide plate 22 for reciprocal movement therein. The slide plate 22 includes an elongated channel 24, best seen in FIG. 7, which channel receives therein the key 12 for movement with the slide plate. FIG. 3 shows a key 12 positioned in the channel, and held fast therein by holding plate member 26, which sandwiches the key 12 between it and the top surface of the channel. This plate member 26 abuts against the upper portion of the key 12 along the shaft 16 thereof. The channel 24 is of such depth as to allow for the shaft 16 and the cut-outs therein to project above the plane containing therein the uppermost surface of the slide plate, so that the projecting probe tip of a circular measuring gauge 30 may enter into each cutout 18 at exactly those ten locations above-described. The measuring gauge 30 is of the conventional type, and is mounted such that the probe 30' thereof moves in a direction transverse to the direction of movement of the slide plate 22, so that the probe 30' may enter into the cuts of the key shaft, at the ten critical locations, above described, as shown in FIG. 3. The movement of the slide plate 22 in a direction taken downwardly in FIGS. 1 and 3 is limited by the contact of the lower edge surface 26' against a stop member 40, which stop member also serves the function of holding the slide plate 22 at each of the ten critical positions, which is accomplished by the provision of a series of semicircular cut-outs 42 which receive therein the circular cross-sectional shape of the stop member 40. There are ten such cut-outs 42, corresponding to the ten critical depth measurements. It is noted that the limit of movement reached by the slide plate 22 when the edge surface 26' contacts the stop member 40 constitutes also the abutment of the shoulder of the key 12 against the probe tip 30'. Thus, upon movement of the slide plate 22 away from the stop member 40, each of the ten critical depth locations may be aligned adjacent the probe tip 30' for the measurement thereof by the gauge 30. The holding plate member 26 may be adjusted along the slide plate 22 by set screw 27, so that optimal position thereof is possible, especially in the light of the fact that the limit of movement of the slide plate 22 is also achieved by the contact of the shoulder 16' of the key 12 against the probe tip 30'. For the Mercedes Benz key, the ten depressions 42 are so spaced relative to each other and with respect to the probe tip 30' so as to correspond to the ten critical depth measurements, though in principal, different spacing thereof may be used for corresponding with the critical depth measurements of other keys besides Mercedes Benz. Ideally, a series of such depressions 42 may be provided to allow for the measurement of different keys in addition to Mercedes Benz, which depressions would provide for a combination of spacings between them and the probe tip 30', so that different makes of keys may be measured.

The stop member 40 is mounted at an end of a slightly resilient thin web section 44, the other end of which is fixedly connected to a fixed mounting cylinder 46 having a large groove formed therein through which the end of the slide plate 22 may move, so that additional support is given to the slide plate, especially when the end of the slide plate is extended in cantilever fashion past the housing 22, in the manner shown in FIG. 1. The slide plate 22 is allowed such sliding movement by the housing backing plate 20', which backing plate is provided with a slot having inwardly sloping side walls, as shown by reference numerals 21 and 23 in FIG. 2. Similarly shaped side walls are provided on the bottom of the slide plate 22 for cooperative engagement with the side walls 21 and 23, to thus allow for the sliding, reciprocating movement of the slide plate 22, and ensuring the proper lateral restraints thereon so that side or lateral movement of the slide plate 22 are effectively prevented, thus ensuring a most precise and accurate reading of the depths of the cuts of the key at the ten critical locations. This wedge-shaped connection between the bottom of the slide plate and the side walls 21 and 23 also prevents the slide plate 22 from being lifted out of the housing. The only possible way of removing the slide plate 22 is by pulling it in the direction away from the stop member 40, which is in the direction pointing to the top of the drawing plane in FIGS. 1 and 3.

The slide plate 22 is reciprocated back and forth by incrementing rack-and-pinion arrangement indicated by reference numerals 50 and 52 in FIG. 3. The rack 50 is formed along a side edge surface of the slide plate 22, which side edge surface faces toward the gauge 30. The pinion 52 is mounted adjacent to the rack on the backing plate 20'. A removeable cover 54 is mountable over the rack-and-pinion incrementing mechanism, as well as over the other structure associated with the slide plate 22 and contacting it. To rotate the pinion 52, a dial 56 is provided on the cover 54, which dial 56 includes a vertical connecting pin that is fixably connected to the pinion 52 so that the pinion 52 and dial 56 rotate in unison, as one body. By rotating the dial 56, the slide plate 22 may be positioned at a desired depth location, where it is held thereat by the stop member 40 serving as an index-positioning member. The dial 56 is provided with a number of reference numerals indicating the depth locations being measured, as shown in FIG. 1. Pointer 58 mounted also on the cover 54 indicates which depth location is being measured.

The gauge 30 has a conventional circular dial indicator which indicates the depth measurement. The dial indicator may be preset so that a coded depth reading results, rather than the actual depth measurement. The gauge 30 is accurate within three-thousandths of an inch. Thus, a new Mercedes Benz key may be measured at its critical depth locations, with the resulting measurements thereof being recorded and stored for future use in the case of loss or theft. The coding that may be used may simply be a fixed value added or subtracted to the actual depth measurement readings, this code thus serving to also uniquely identify each key.

FIGS. 9 through 14 show the second embodiment of the present invention in the case where a double shelf Mercedes Benz key is to be measured. Such a double shelf key is indicated by reference numeral 112 in FIG. 13. The double shelf key has a shoulder 116' from which depth measurements are to be taken along the shaft 116, which shaft includes cuts 118 on both side edge surfaces thereof.

The apparatus 110 of FIG. 9 includes the same general structure and components as the embodiment shown in FIG. 1, with the only difference being that a pair of conventional circular dial gauges 130 are provided, in order to measure the depth of the cuts on both of the side edge surfaces of a double shelf key. The parts of device 110 that are the same as the parts in the device 10 are indicated by prefixing the number 1 before the like part in the first embodiment, thus pinion 52 of the first embodiment corresponds to pinion 152 in FIG. 10.

The two gauges 130, each having its own probe tip 130', are mounted on opposite sides of the slide plate 122, with the probes 130' being coplaner and coextensive, as shown in FIGS. 10 and 11. The operation of the device 110 is the same as the operation of device 10, with the only resulting functional difference being that two cuts are measured simultaneously, as is clearly evident by the nature of the measuring being performed, since it is a double shelf key that is being measured.

While specific embodiments of the invention have been shown and described, it is to be understood that numerous changes and modifications may be made therein without departing from the scope and spirit of the invention as set out in the appended claims. For example the set screw 160, which when loosened allows rotation of the dial face of the gauge 130 may be so chosen to provide a desired coding format for the depth measurements, since the needle constituting the pointer of the gauge is for intents and purposes fixed in its orientation relative to the movement of the probe tip 130'.

It is noted that for the double shelf key there are only seven depth locations to be measured. These are: 0.190 inches from the shoulder 116'; 0.290 inches; 0.395 inches; 0.495 inches; 0.620 inches; 0.710 inches; and 0.800 inches from the shoulder 116', in the case of a Mercedes Benz key.

What is claimed is:

1. A key-decoding device for Mercedes Benz keys, and the like, for precisely measuring the depth of each cut of a key, the cuts defining a key code, comprising:
    a measuring gauge having a projecting depth measuring tip for insertion into each of the cuts of the key to be measured for determining the depth of cut of each cut thereof in order to determine said key code;
    slide carrier means for holding the key to be measured and for selectively positioning each cut of the key to be measured directly adjacent and in alignment with said projecting depth measuring tip on a cut-by-cut basis, so that said tip may enter into each cut for measuring the depth of the cut;
    incrementing means for advancing said slide carrier means on an incremental basis so as to position the key to be measured in alignment with said tip for all of the depths of cut of the key that determine the unique and individual key code of the key;
    positioning means for holding said slide carrier in each of the incremented positions by which a cut of the key to be measured is gauged by said tip;
    housing means for mounting said slide carrier means for reciprocal movement, said incrementing means and said positioning means;
    said slide carrier means comprising an elongated, substantially-horizontal channel of substantially U-shaped cross-section in which is placed the key to be measured for movement along with said slide carrier means when said incrementing means moves said slide carrier means, so that said slide carrier means may position the key in alignment with said tip at each of incremented positions thereof, the depths of which are to be measured, said elongated channel having a depth less than the thickness of a key to be measured so that cuts of the key project above said elongated channel so that said measuring tip may measure the depths of the cuts of the key thereby;
    said slide carrier means having an elongated side edge surface extending the length of said elongated channel and parallel thereto; said incrementing means comprising a rack-and-pinion arrangement, said rack being formed along said side edge surface of said slide carrier means, and said pinion being mounted on said housing means for cooperative engagement with said rack;
    said measuring gauge tip being mounted for reciprocal movement in a direction transverse to the direction of movement of said slide carrier means.

2. The device according to claim 1, wherein said slide carrier means comprises another elongated side edge surface parallel to said one elongated side edge surface; said positioning means comprising a stop means mounted on said housing in close proximity to said another elongated side edge surface; said another side edge surface comprising a plurality of spaced-apart cut-outs in which said stop means may be yieldingly positioned to hold said slide carrier means in the positions in which the necessary depths of cut of the key are measured; and means for resiliently urging said stop means toward said another side edge surface.

3. The device according to claim 1, wherein said incrementing means further comprises a knob means fixedly connected to said pinion for rotating said pinion by hand, said knob means having a plurality of indices thereon for indicating the relative position of said slide carrier means; said knob means projecting outside of said housing.

4. The device according to claim 1, wherein said elongated channel has a lateral width taken in a direction transverse to the length thereof that is less than the lateral width of the head portion of the key to be measured, so that when said slide carrier means is moved a desired distance for measuring the depths of cuts of the key, the head portion abuts against said tip of said measuring gauge to prevent further travel of said slide carrier means.

5. The device according to claim 2, wherein said slide carrier means further comprises means for clamping the key in said elongated channel; said means for clampinmg being mounted to said another side edge surface for movement therewith, said means for clamping also defining the end of travel of said slide carrier means by abutting against said stop means.

6. The device according to claim 4, in combination with a key to measured, said key being disposed in said channel horizontally with the cut-outs thereof facing toward one of said side edge surfaces.

* * * * *